United States Patent [19]
Murphy

[11] Patent Number: 5,403,163
[45] Date of Patent: Apr. 4, 1995

[54] MOTOR MOUNT FOR BLOWER HOUSING

[75] Inventor: Timothy M. Murphy, Arlington, Tex.

[73] Assignee: Molded Products Company, Fort Worth, Tex.

[21] Appl. No.: 89,277

[22] Filed: Jul. 8, 1993

Related U.S. Application Data

[63] Continuation-in-part of Ser. No. 569,830, Aug. 20, 1990, Pat. No. 5,230,612.

[51] Int. Cl.6 .......................... F04B 17/00; F16M 1/04
[52] U.S. Cl. ............................ 417/350; 417/423.15; 248/638
[58] Field of Search .............. 417/350, 423.15, 423.14; 248/638, 664, 672

[56] References Cited

U.S. PATENT DOCUMENTS

| | | | |
|---|---|---|---|
| 3,083,308 | 3/1961 | Baumann | 417/350 |
| 3,102,483 | 9/1963 | Nasiman | 417/350 |
| 3,120,340 | 2/1964 | Strumpell | 417/350 |
| 3,390,401 | 6/1968 | Matsuyoshi | 417/350 |
| 3,856,431 | 12/1974 | Tucker | 417/350 |
| 4,165,953 | 8/1979 | Lane | 417/350 |
| 4,171,190 | 10/1979 | Hudson | 248/638 |
| 4,482,124 | 11/1984 | Dochterman | 248/672 |
| 4,672,819 | 6/1987 | Mino | 417/423.14 |
| 4,676,473 | 6/1987 | Giles | 248/638 |
| 4,902,203 | 2/1990 | Sager | 417/350 |

Primary Examiner—Richard A. Bertsch
Assistant Examiner—Peter Korytnyk
Attorney, Agent, or Firm—Arthur F. Zobal

[57] ABSTRACT

A blower housing is formed by two housing members each of which has a motor chamber portion located on one side of a blower chamber portion. The open sides of the a housing members are fitted together to form a motor chamber and a blower chamber for receiving a motor and a blower coupled to a shaft of the motor extending from one end thereof. The structure forming the motor chamber portion of each of the two housing members has at least one arcuate slot formed between two arcuate edges for removably receiving at least one gasket such that arcuate edges and gaskets are provided for holding the housing of the motor. The two housing members may be formed with motor chambers portions with arcuate slots and arcuate edges of different sizes to receive and hold motor housings of different sizes.

20 Claims, 8 Drawing Sheets

MOTOR MOUNT FOR BLOWER HOUSING

This application is a continuation-in-part of application Ser. No. 07/569,830, filed Aug. 20, 1990, now U.S. Pat. No. 5,230,612.

BACKGROUND OF THE INVENTION

1. Field of the Invention

The invention relates to a blower housing for a blower driven by a motor.

2. Description of the Prior Art

U.S. Pat. No. 3,874,191 discloses a blower housing for dual blowers driven by an intermediately disposed motor for the circulation of air. Although the apparatus of this patent operates satisfactory, problems have occurred in the manner that the motor has been supported. In the past, the motor has been engaged and supported only by two gaskets which sometimes results in the motor being unbalanced or tilted and not horizontal relative to the blower housing which results in the blowers hitting the inside of the blower housing upon rotation.

SUMMARY OF THE INVENTION

It is an object of the invention to provide a blower housing for a blower and which can receive effectively and a hold motor and which minimizes vibration.

The blower housing is formed by two housing members each of which has a motor chamber portion located on one side of a blower chamber portion. The two housing members each has an open side leading to the motor and blower chamber portions respectively with edges adapted to fit together to form a motor chamber for receiving and holding a motor and a blower chamber for receiving a blower coupled to shaft means of the motor. The motor chamber portions each comprise an arcuate portion having at least one arcuate slot formed between two arcuate edges. A gasket is provided to be removably located in each of the arcuate slots of the motor chamber portions such that when the edges of the two housing members are fitted together, the housing of the motor is engaged and held by the arcuate edges and by the gaskets. The two housing members may be formed with motor chamber portions with arcuate slots and arcuate edges of different sizes to receive and hold motor housings of different sizes.

BRIEF DESCRIPTION OF THE DRAWINGS

In FIG. 9 the motor is only partially shown. The motor shafts are not shown and the blowers are shown in dotted form.

DESCRIPTION OF THE EMBODIMENTS OF FIGS. 1-9

Referring to FIGS. 1-9 of the drawings the blower housing is identified by reference numeral 21 and comprises a bottom housing member or scroll 23 and a top housing member or scroll 53. The bottom housing member 23 has a motor chamber portion 23MC located between two blower chamber portions 23BC1 and 23BC2 which are open from edges 23MCE and 23BC1E and 23BC2E and hence from side 25.

Figure 3:
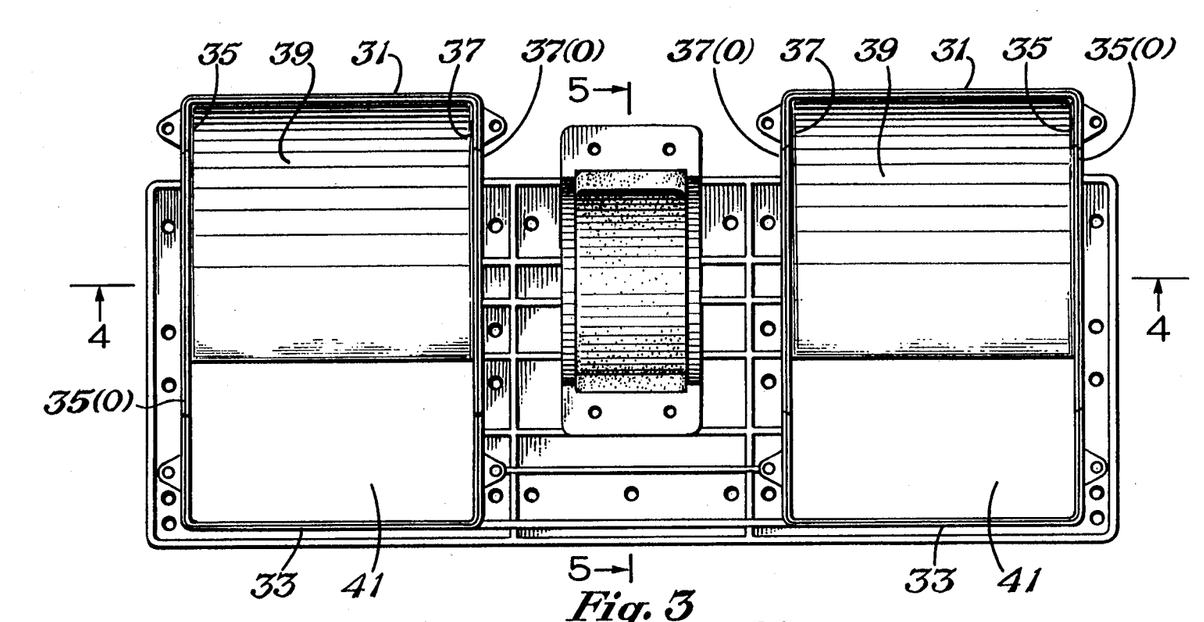
FIG. 3 is a top plan view of the bottom housing member or scroll of the housing of FIG. 1.
Figure 4:
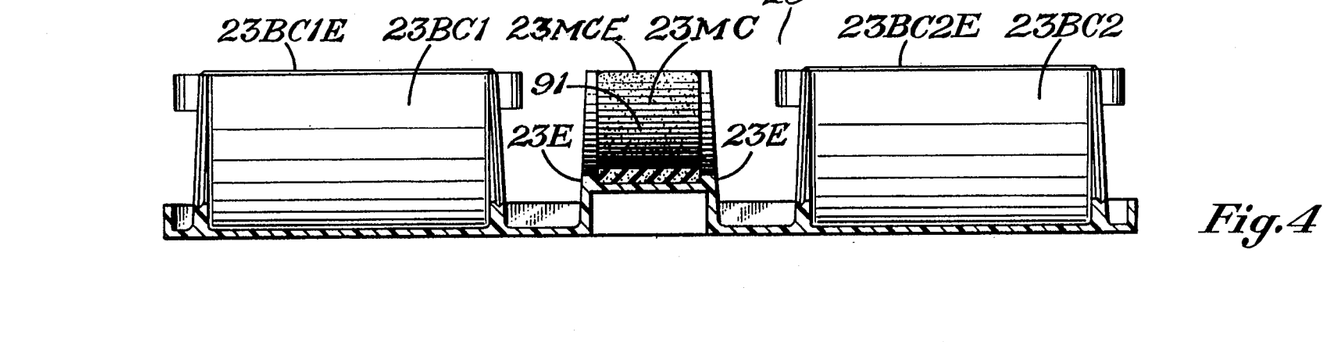
FIG. 4 is a cross-sectional view of the housing member of FIG. 3, taken along lines 4—4 thereof.
Figure 5:
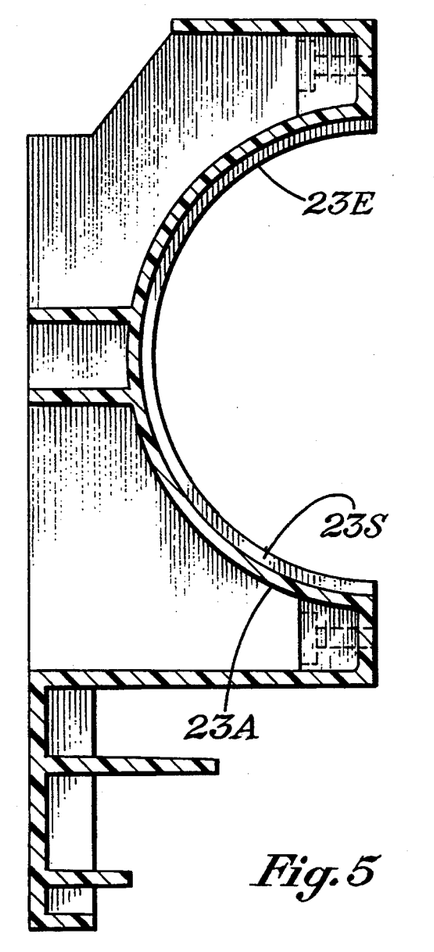
FIG. 5 is a cross-sectional view of the housing member of FIG. 3 taken along lines 5—5 thereof.

The motor chamber portion 23MC is a cavity in the form of a semi-circle in cross section. The blower chamber portions 23BC1 and 23BC2 are identical cavities each formed by end walls 31 and 33, side walls 35 and 37, and a bottom wall portion 39. Side walls 35 and 37 have semi-circle openings 35(0) and 37(0) formed therethrough. The bottom walls 39 do not extend completely across the bottom openings of the cavities 23BC1 and 23BC2 leaving small bottom openings 41. The bottom housing member 23 is a single member molded from plastic.

Figure 6:
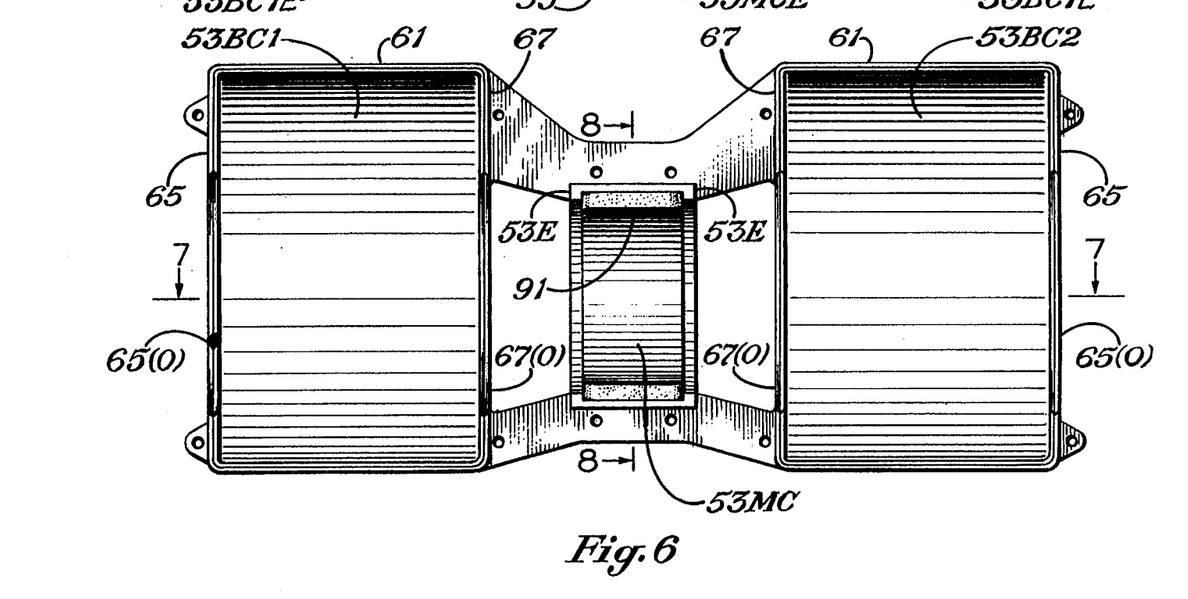
FIG. 6 is a top plan view of the top housing member or scroll of the housing of FIG. 1.
Figure 7:
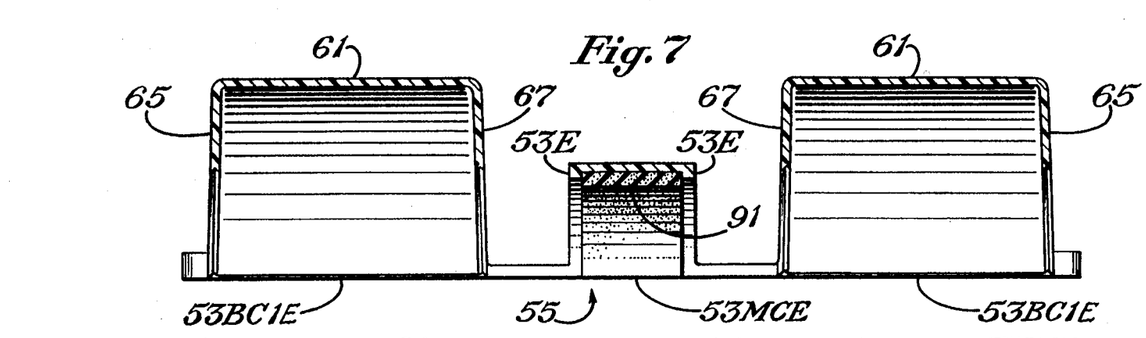
FIG. 7 is a cross-sectional view of the housing member of FIG. 6, taken along lines 7—7 thereof.
Figure 8:
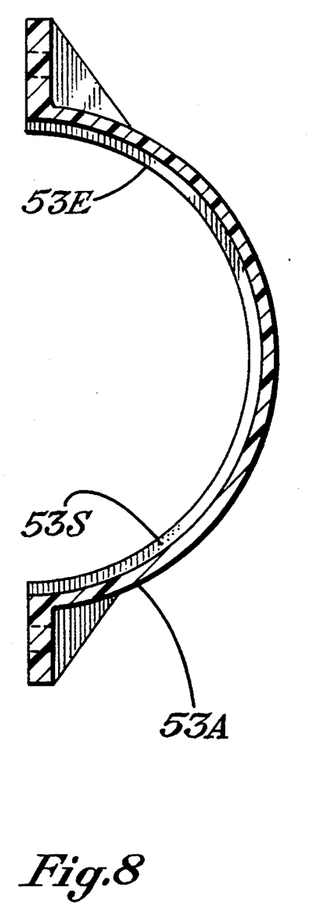
FIG. 8 is a cross-sectional view of the housing member of FIG. 6, taken along lines 8—8 thereof.

The top housing member 53 has a motor chamber portion 53MC located between two blower chamber portions 53BC1 and 53BC2 which are open from edges 53MCE and 53BC1E and 53BC2E and hence from side 55.

The motor chamber portion 53MC is a cavity in the form of a semi-circle in cross section. The blower chamber portions 53BC1 and 53BC2 are identical cavities each formed by a semi-circular wall 61 and side walls 65 and 67. Side walls 65 and 67 have semi-circle openings 65(0) and 67(0) formed therethrough. The top housing member 53 is a single member molded from plastic.

Figures 1, 2:
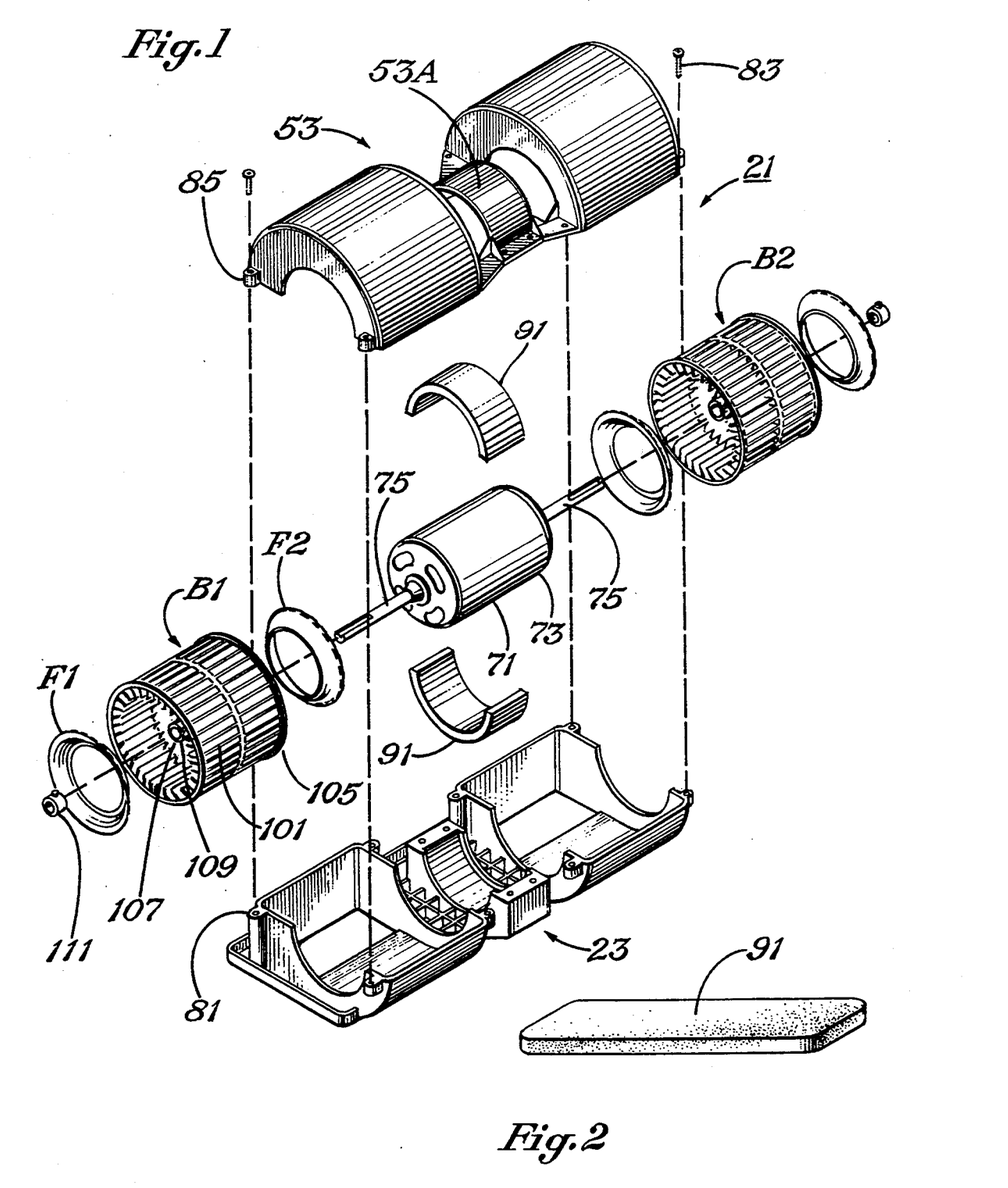
FIG. 1 is an exploded view of the blower housing of application Ser. No. 07/569,830 with a motor and blowers illustrated.
FIG. 2 is a view of a gasket used in the housing of FIG. 1.
Figure 9:
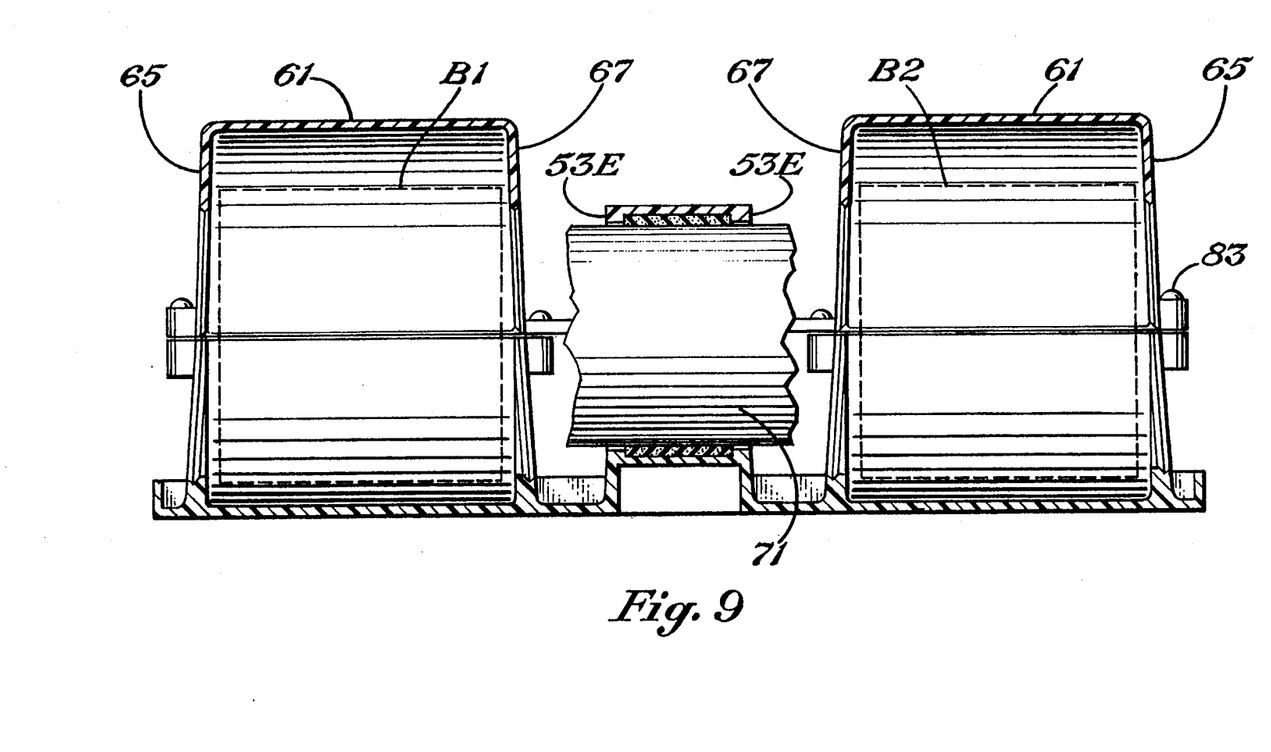
FIG. 9 is a cross-sectional view of the two housing members fitted together and holding a motor housing.

The edges 23MCE, 23BC1E and 23BC2E and 53MCE, 53BC1E and 53BC2E of the bottom and top members 23 and 53 can be fitted together respectively to form a motor chamber from motor chamber portions 23MC and 53MC; and two blower chambers from blower chamber portions 23BC1 and 53BC1 and blower chamber portions 23BC2 and 53BC2 respectively for receiving the cylindrical housing 71 of a motor 73 and conventional cylindrical squirrel cage blowers B1 and B2 connected to the shafts 75 of the motor 73.

The bottom and top housing members 23 and 53 are secured together by screws 83 which are inserted through guide holes 85 formed through member 53 and screwed into threaded holes 87 formed in member 23.

The motor housing 71 is secured and held in place in the motor chamber 23MC, 53MC by arcuate edges of the housing members 23 and 53 and by two gaskets 91 which are removably fitted in arcuate (semi-circle) slots or channels 23S and 53S formed in the central arcuate walls 23A and 53A of the members 23 and 53 defining the motor chamber portions 23MC and 53MC. The slots 23S and 53S each are formed between two arcuate (semi-circle) edges 23E and 53E of the walls 23A and 53A respectively of the members 23 and 53.

The gaskets 91 are rectangular in shape and have a thickness such that they extend radially inward of the edges 23E and 53E when fitted in the slots 23S and 53S such that they will engage and be compressed by the motor housing 71 when it is fitted in the motor chamber 23MC, 53MC and the edges of the members 23 and 53 are fitted and secured together by the screws 83. The gasket 91 in the preferred embodiment is an injection molded elastomer or thermoplastic rubber known as SANTOPRENE produced by Monsanto Chemical Company. It has a durometer of 55. Gaskets of various durometers can be used.

FIG. 9 illustrates the motor housing 71 secured in the motor chamber of the motor chamber when the edges of the two members 23 and 53 are fitted and secured together by the screws 83. In this position, the arcuate surfaces of the edges 23E and 53E engage and support the motor housing 71 parallel with the edges 23BC1E, 23MCE, 23BC2E and 53BC1E, 53MCE, 53BC2E whereby the blowers cannot hit the inside walls of the blower chambers. The gaskets 91 prevent the motor housing 71 from sliding and reduce vibration.

The housing members 23 and 53 may be formed such that each of the inside walls 23A and 53A of the slots 23S and 53S has a radius of from 1.6 to 1.8 inches and the inside surfaces of each of the edges 23E and 53S has a radius of from 1.5 to 1.7 inches respectively to form motor chambers of different sizes to receive and hold motor housings of different diameters with the use of the same size gaskets 91. The thickness of the gaskets should be 50% greater than the depth of the slots 23S, 53S from the edges 23E and 53E respectively. The material and the thickness of the gaskets however, should allow the gaskets to be compressed sufficient to allow the edges 23E and 53E of the slots to engage the motor housing when assembled in place. In one embodiment the gasket 91 has a thickness of about $\frac{1}{8}$ of an inch, a width of about $1\frac{3}{8}$ of an inch and a length of about $4\frac{3}{8}$ inches. Thus the housing 21 can be formed to accommodate A.C. or D.C. motors which vary in diameter and are produced by different companies.

The slots 23S and 53S in one embodiment each has a width of about $1\frac{3}{8}$ of an inch for tightly accepting the gaskets 91. The gaskets 91 have a length such that they will extend along substantially the entire inside circumferences of the slots 23S and 25S.

It is to be understood that each of the top and bottom housing members may be constructed to form two narrower side-by-side slots in their motor chamber portions, separated by an intermediate arcuate edge respectively for accepting two narrower gaskets 91. Thus each motor chamber portion will have two gaskets for engaging and facilitating in the holding of the motor housing.

The blowers B1 and B2 are identical and comprise spaced apart slots 101 or vanes connected to rims 103 and 105 and to an intermediate disk 107 located within the blowers. The disk 107 has a central aperture 109 formed therethrough for receiving a shaft 75 which is secured to the disk 107 by a clip 111. The blowers are formed of a suitable plastic.

Members F1 and F2 are annular plastic flanges which are snap fitted to the structure forming the side openings 35(0), 65(0) and 37(0), 67(0) of the blower chambers. When the motor is held by the gaskets 91, the shafts 75 extend through the opening of flanges F1 and F2 into the blower chambers 23BC1, 53BC1 and 23BC2, 53BC2 in which are located the blowers B1 and B2 for rotation. Upon rotation of the blowers B1 and B2, air is drawn through the openings of the flanges F1 and F2 and forced outward through openings 41 onto the evaporator coil of a motor vehicle air conditioner for cooling or ventilation purposes or other air movement applications.

The housing members 23 and 53, flanges F1 and F2 and blowers B1 and B2 may be formed of suitable thermoplastic materials such as ABS. It is to be understood that the housing members 23 and 53 and their gaskets may have dimensions different from those mentioned above.

DESCRIPTION OF THE EMBODIMENTS OF FIGS. 10–13

Referring to FIGS. 10—13 of the drawings, the blower housing is identified by reference numeral 121 and comprises a first side housing member or scroll 123 and a second side housing member or scroll 153. The housing member 123 has a motor chamber portion 123MC and a blower chamber portion 123BC which is open from edges 123MCE and 123BCE and hence from side 125.

Figure 12:
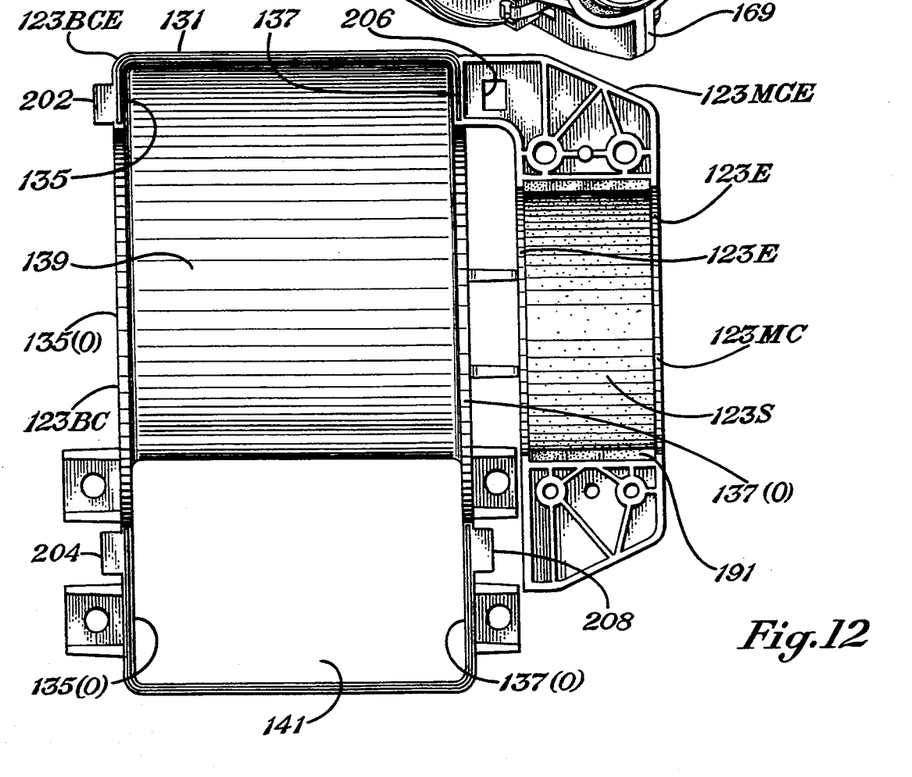
FIG. 12 is a plan view of the inside of the left housing member shown in FIGS. 10 and 11.

The motor chamber portion 123MC is a cavity formed by an arcuate wall 123A which is in the form of a semicircle in cross section. The blower chamber portion 123BC is a cavity formed by end walls 131 and 133(0), side walls 135 and 137, and an arcuate wall portion 139. Side walls 135 and 137 have semi-circle openings 135(0) and 137(0) formed therethrough. The wall 139 does not extend completely to end wall portion 133(0) leaving an opening 141 which leads to an outlet 141(0) formed between wall portions 133(0), 135(0), 137(0) and 139. The housing member 123 is a single member molded from plastic with members 123MC and 123BC coupled together with connecting members 143.

Figure 13:
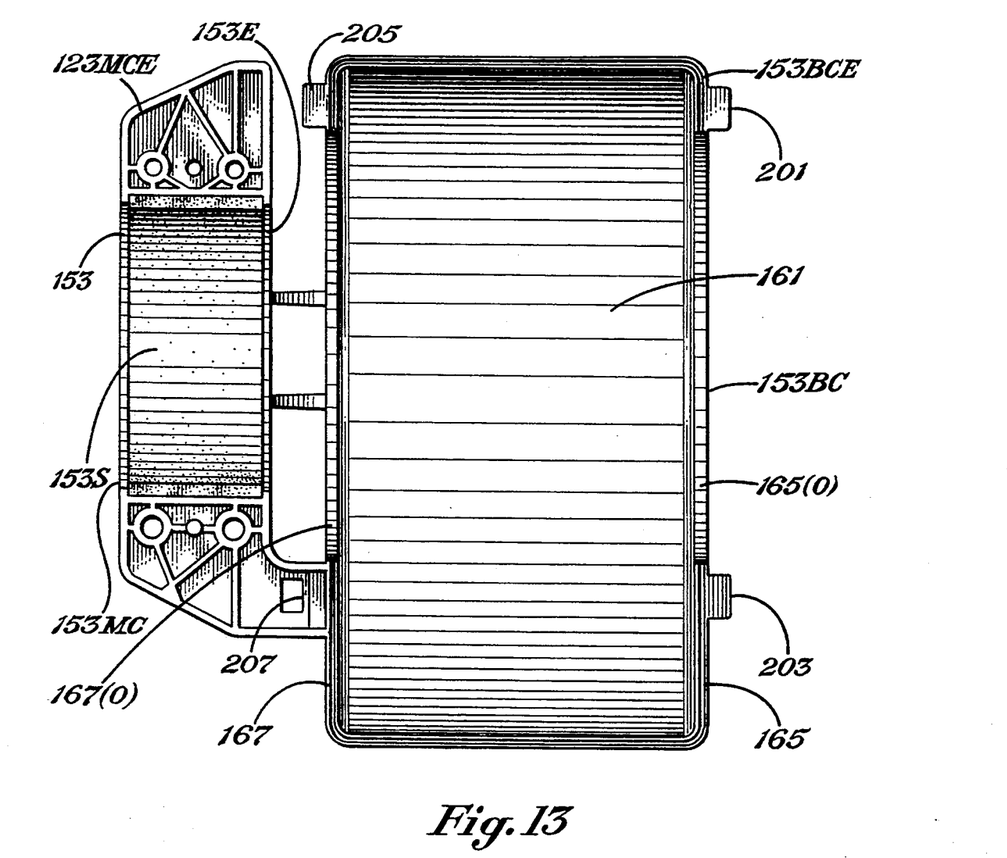
FIG. 13 is a plan view of the inside of the right housing member shown in FIGS. 10 and 11.

The other housing member 153 has a motor chamber portion 153MC and a blower chamber portion 153BC which are open from edges 153MCE and 153BCE and hence from side 155.

The motor chamber portion 153MC is a cavity formed by an arcuate wall 153A which is in the form of a semicircle in cross section. The blower chamber portions 153BC is formed by a semi-circular wall 161 and side walls 165 and 167. Side walls 165 and 167 have semicircle openings 165(0) and 167(0) formed therethrough. The housing member 153 is a single member molded from plastic with members 153MC and 153BC coupled together with connecting members 169 and 171.

Figure 10:
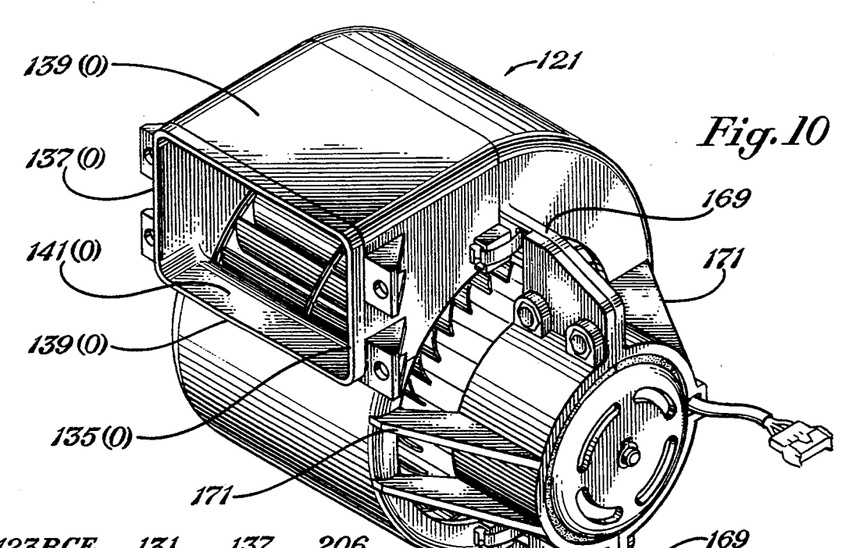
FIG. 10 is an isometric view of the blower housing of the invention.
Figure 11:
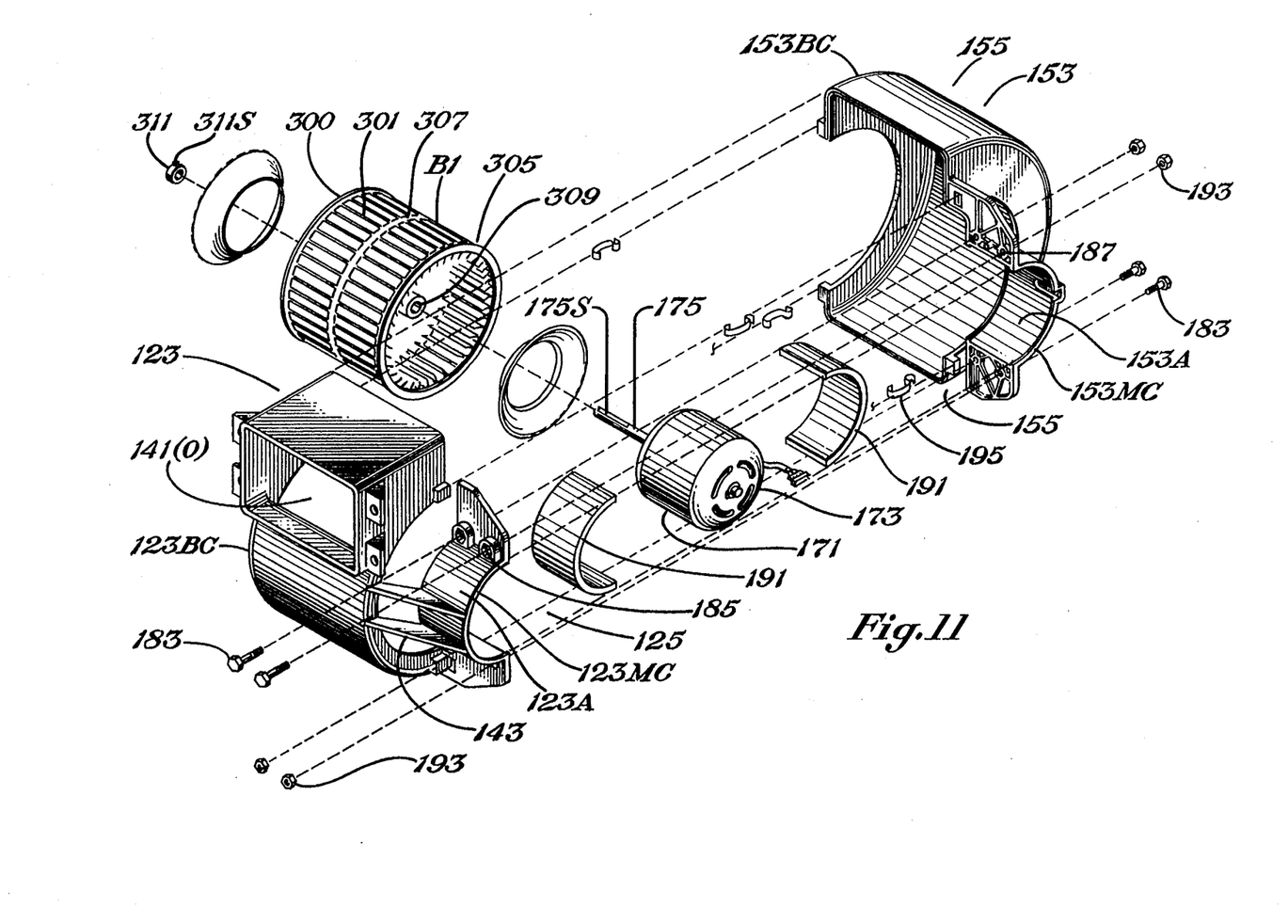
FIG. 11 is an exploded view of the blower housing of FIG. 10 with a motor and blower illustrated.

The edges 123MCE, 123BCE and 153MCE, and 153BCE of the members 123 and 153 can be fitted together respectively to form a motor chamber from motor chamber portions 123MC and 153MC; and a blower chamber from blower chamber portions 123BC and 153BC for receiving the cylindrical housing 171 of a motor 173 and a conventional cylindrical squirrel cage blower B1 connected to the shaft 175 of the motor 173.

Housing members 123 and 153 are secured together by bolts 183 which are inserted through holes 185 and 187 formed through members 123MC and 153MC and screwed to nuts 193 and by the use of metal clips 195 which are clipped to members 201, 202; 203, 204; 205, 206; 207, 208 of the two housing members 123 and 125.

The motor housing 171 is secured and held in place in the motor chamber 123MC, 153MC by arcuate edges of the housing members 123 and 153 and by two gaskets 191 which are removably fitted in arcuate (semi-circle) slots or channels 123S and 153S formed in the central arcuate walls 123A and 153A of the motor chamber portions 123MC and 153MC. The slots 123S and 153S each are formed between two arcuate (semi-circle) edges 123E and 153E of the walls 123A and 153A respectively of the members 123 and 153.

The gaskets 191 are rectangular in shape and have a thickness such that they extend radially inward of the edges 123E and 153E when fitted in the slots 123S and 153S such that they will engage and be compressed by the motor housing 171 when it is fitted in the motor chamber 123MC, 153MC and the edges of the members 123 and 153 are fitted and secured together by the screws 183 and clips 193. The gasket 191 in the preferred embodiment is an injection molded elastomer or thermoplastic rubber known as SANTOPRENE produced by Monsanto Chemical Company. It has a durometer of 55. Gaskets of various durometers and similar resilient materials can be used.

FIG. 10 illustrates the motor housing 171 secured in the motor chamber of the motor chamber when the edges of the two members 123 and 153 are fitted and secured together by the screws 183 and clips 193. In this position, the arcuate surfaces of the edges 123E and 153E engage and support the motor housing 171 parallel with the edges 123BCE, 123MCE, and 153BCE, and 163MCE whereby the blowers cannot hit the inside walls of the blower chambers. The gaskets 191 prevent the motor housing 171 from sliding and reduce vibration.

The housing member 123 and 153 may be formed such that each of the inside walls 123A and 153A of the slots 123S and 153S has a radius of from 1.6 to 1.8 inches and the inside surfaces of each of the edges 123E and 153E has a radius of from 1.5 to 1.7 inches respectively to form motor chambers of different sizes to receive and hold motor housings of different diameters with the use of the same size gaskets 191. These dimensions may be varied. The thickness of the gaskets should be approximately 50% greater than the depth of the slots 123S, 153S from the edges 123E and 153E respectively. The material and the thickness of the gaskets however, should allow the gaskets to be compressed sufficient to allow the edges 123E and 153E of the slots to engage the motor housing when assembled in place. In one embodiments the gasket 191 has a thickness of about $\frac{1}{8}$ of an inch, a width of about $1\frac{3}{8}$ of an inch and a length of about $4\frac{3}{8}$ inches. Thus the housing 21 can be formed to accommodate A.C. or D.C. motors which vary in diameter and are produced by different companies.

The slots 123S and 153S in one embodiment each has a width of about $1\frac{3}{8}$ of an inch for tightly accepting the gaskets 191. The gaskets 191 have a length such that they will extend along substantially the entire inside circumferences of the slots 123S and 125S.

It is to be understood that each of the two housing members may be constructed to form two or more narrower side-by-side slots in their motor chamber portions, separated by an intermediate arcuate edge respectively for accepting two or more narrower gaskets 191. Thus each motor chamber portion will have two or more gaskets for engaging and facilitating in the holding of the motor housing.

The blower B1 comprises spaced apart slots 301 or vanes connected to rims 303 and 305 and to an intermediate disk 307 located within the blower. The disk 307 has a central aperture 309 formed therethrough for receiving the shaft 175 which is secured to the disk 307 with the use of annular member 311. Shaft 175 has a slot 175S which receives a lug in the aperture 309. Annular member 311 is located around the end of the shaft 175 and a set screw is screwed into the slot 175S of the shaft 175 which extends beyond the aperture to secure member 311 and hence the blower to the shaft 175. The blower is formed of a suitable plastic.

Members F1 and F2 are annular plastic flanges which are snap fitted to the structure forming the side openings 135(0), 165(0) and 137(0), 167(0) of the blower chambers. When the motor is held by the gaskets 191, the shafts 175 extend through the opening of flanges F1 and F2 into the blower chambers 123BC, 153BC in which is located the blower B1 for rotation. Upon rotation of the blower air is drawn through the openings of the flanges F1 and F2 and forced outward through opening 141 and outlet 141(0) onto the evaporator coil (or free air) of a motor vehicle air conditioner for cooling, heating, or ventilation purposes, as well as other heating, cooling, and ventilating purposes in industrial, commercial or residential use.

The housing members 123 and 153, flanges F1 and F2 and blower B1 may be formed of suitable thermoplastic materials such as ABS, or other flame retardant or high heat plastic materials as required. It is to be understood that the housing members 123 and 153 and their gaskets may have dimensions different from those mentioned above.

I claim:

1. A blower housing for a blower to be driven by a motor, the blower being coupled to shaft means of the motor on one end thereof, comprising:

two housing members each having a motor chamber portion located on one side of a blower chamber portion, said two housing members each having edge means adapted to fit together to form a motor chamber for receiving and holding a motor and a blower chamber for receiving a blower coupled to one end of the motor by said shafts means, said motor chamber portions each comprising an arcuate portion having at least one arcuate slot formed between two arcuate edges, a separate gasket adapted to be removably located in each of said arcuate slots of said motor chamber portions such that when said edge means of said two housing members are fitted together, the housing of the motor is engaged and held by said arcuate edges and by said gaskets when located in said arcuate slots of said motor chamber portions.

2. The blower housing of claim 1, wherein:
   each of said gaskets are rectangular in shape and have a given thickness.

3. The blower housing of claim 2, wherein:
   each of said gaskets has a thickness greater than the depth of said slots,
   each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

4. The blower housing of claim 1, wherein:
   the thickness of each of said gaskets is greater than the depth of said slots, each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

5. The blower housing of claim 4, wherein said two housing members each have a single blower chamber portion for forming a single blower chamber.

6. The blower housing of claim 1, wherein said two housing members each have a single blower chamber portion for forming a single blower chamber.

7. The blower housing of claim 1, wherein:
said gaskets each have two opposite side edges for engaging said two arcuate edges of said arcuate slots respectively when located in said arcuate slots.

8. A blower housing apparatus for a blower to be driven by a motor, the blower being coupled to shaft means of the motor on one end thereof, comprising:
a blower coupled to one end of a motor by shaft means such that said motor can rotate said blower by way of said shaft means,
two housing members each having a motor chamber portion located on one side of a blower chamber portion,
said two housing members each having edge means adapted to fit together to form a motor chamber for receiving and holding said motor and a blower chamber for receiving said blower coupled to said shaft means of the motor extending from one end thereof,
said motor chamber portions each comprising an arcuate portion having at least one arcuate slot formed between two arcuate edges,
a separate gasket removably located in each of said arcuate slots of said motor chamber portions,
said edge means of said two housing members being fitted together with said motor being located in said motor chamber and the housing of said motor being engaged and held by said arcuate edges and by said gaskets and said blower being located in said blower chamber.

9. The blower housing apparatus of claim 8, wherein:
each of said gaskets has a thickness greater than the depth of said slots,
each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

10. The blower housing apparatus of claim 9, wherein a single blower is coupled to said shaft means of said motor and said two housing members each have a single blower chamber portion for forming a single blower chamber.

11. The blower housing apparatus of claim 8, wherein:
each of said gaskets are rectangular in shape and have a given thickness.

12. The blower housing apparatus of claim 11, wherein:
the thickness of each of said gaskets is greater than the depth of said slots,
each of said gaskets is formed of a compressible material whereby said gaskets are compressed by the housing of said motor when said edge means of said two housing members are fitted together with said motor located in said motor chamber such that said motor is engaged and held by said arcuate edges and by said gaskets.

13. The blower housing apparatus of claim 8, wherein a single blower is coupled to said shaft means of said motor and said two housing members each have a single blower chamber portion for forming a single blower chamber.

14. The blower housing apparatus of claim 8, wherein:
said gaskets each have two opposite side edges for engaging said two arcuate edges of said arcuate slots respectively when located in said arcuate slots.

15. A blower housing for a blower to be driven by a motor, the blower being coupled to shaft means of the motor on one end thereof, comprising:
two housing means each having a motor chamber portion and a blower chamber portion,
said two housing means each having edge means adapted to fit together to form a motor chamber for receiving and holding a motor and a blower chamber for receiving a blower coupled to one end of the motor by said shafts means,
said motor chamber portions each comprising an arcuate portion having at least one arcuate slot formed between two arcuate edges,
compressible gasket means adapted to be removably located in each of said arcuate slots of said motor chamber portions for use for holding the housing of the motor when said edge means of said two housing members are fitted together,
said compressible gasket means having two opposite side edges for engaging said two arcuate edges of said arcuate slots respectively when located in said arcuate slots.

16. The blower housing of claim 15, wherein:
said compressible gasket means has a given width and normal thickness greater than the depth of each of said arcuate slots.

17. The blower housing of claim 16, wherein:
said compressible gasket means is continuous across its width and said normal thickness is substantially constant over said entire compressible gasket means.

18. A blower housing apparatus for a blower to be driven by a motor, the blower being coupled to shaft means of the motor on one end thereof, comprising:
a blower coupled to one end of a motor by shaft means such that said motor can rotate said blower by way of said shaft means,
two housing means each having a motor chamber portion and a blower chamber portion,
said two housing means each having edge means adapted to fit together to form a motor chamber for receiving and holding said motor and a blower chamber for receiving said blower coupled to said shaft means of the motor extending from one end thereof,
said motor chamber portions each comprising an arcuate portion having at least one arcuate slot formed between two arcuate edges, compressible gasket means removably located in each of said arcuate slots of said motor chamber portions for use for holding the housing of the motor, said edge means of said two housing members being fitted together with said motor being located in said motor chamber and the housing of said motor being engaged by said compressible gasket means and said blower being located in said blower chamber, said compressible gasket means having two opposite side edges for engaging said two arcuate edges of said arcuate slots respectively when located in said arcuate slots.

19. The blower housing apparatus of claim 18, wherein:

said compressible gasket means has a given width and a normal thickness greater than the depth of each of said arcuate slots.

20. The blower housing apparatus of claim 19, wherein:

said compressible gasket means is continuous across its width and said normal thickness is substantially constant over said entire compressible gasket means.

* * * * *